US008608358B2

(12) United States Patent
Schnerr et al.

(10) Patent No.: US 8,608,358 B2
(45) Date of Patent: Dec. 17, 2013

(54) LIGHTING DEVICE OF A MOTOR VEHICLE

(75) Inventors: Michael Schnerr, Reutlingen-Sondelfingen (DE); Dirk Blum, Tuebingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 267 days.

(21) Appl. No.: 12/973,116

(22) Filed: Dec. 20, 2010

(65) Prior Publication Data

US 2011/0149588 A1    Jun. 23, 2011

(30) Foreign Application Priority Data

Dec. 22, 2009 (DE) .................... 10 2009 060 790

(51) Int. Cl.
*B60Q 1/00* (2006.01)
*F21V 29/00* (2006.01)

(52) U.S. Cl.
USPC ............ 362/547; 362/546; 362/549; 362/373

(58) Field of Classification Search
USPC ............... 362/545, 249.02, 249.05, 546, 547, 362/549, 373
See application file for complete search history.

(56) References Cited

U.S. PATENT DOCUMENTS

| | | | |
|---|---|---|---|
| 6,254,262 B1 * | 7/2001 | Crunk et al. .................. | 362/544 |
| 7,153,008 B2 * | 12/2006 | Grote et al. ................... | 362/487 |
| 7,614,771 B2 * | 11/2009 | McKechnie et al. .......... | 362/543 |
| 2003/0002179 A1 * | 1/2003 | Roberts et al. ................ | 359/838 |
| 2009/0045933 A1 * | 2/2009 | Smith et al. ................... | 340/468 |
| 2009/0067169 A1 | 3/2009 | Helbig et al. | |

FOREIGN PATENT DOCUMENTS

| | | |
|---|---|---|
| DE | 202004003793 U1 | 6/2004 |
| DE | 102007024390 A1 | 5/2008 |
| DE | 102007041817 A1 | 3/2009 |

OTHER PUBLICATIONS

Jan. 22, 2010 German Examination Report for DE 10 2009 060 790.0-54.

* cited by examiner

*Primary Examiner* — Thomas Sember
(74) *Attorney, Agent, or Firm* — Howard & Howard Attorneys PLLC

(57) ABSTRACT

A light module for a vehicle lighting device comprises a semiconductor light source mounted on a carrier element designed. on/including a first printed-circuit board. A control module is electrically connected to and structurally spaced from the light source and designed on/includes a second printed-circuit board and includes an electric circuit constructed upon the second board and a connection element adapted w be connected to a higher-level controller and/or vehicle power supply. The control module is an electronic component of the light source such that a cable does not connect the control module and light source to each other. A highly thermally conductive carrier module is arranged between the light source and control module and directly attached to the carrier element, second printed-circuit board, and electric circuit. An electrical connection is located on the carrier module between the fight source or carrier element and electric circuit or second printed-circuit board.

16 Claims, 2 Drawing Sheets

LIGHTING DEVICE OF A MOTOR VEHICLE

CROSS-REFERENCE TO RELATED APPLICATION

Figure 1:
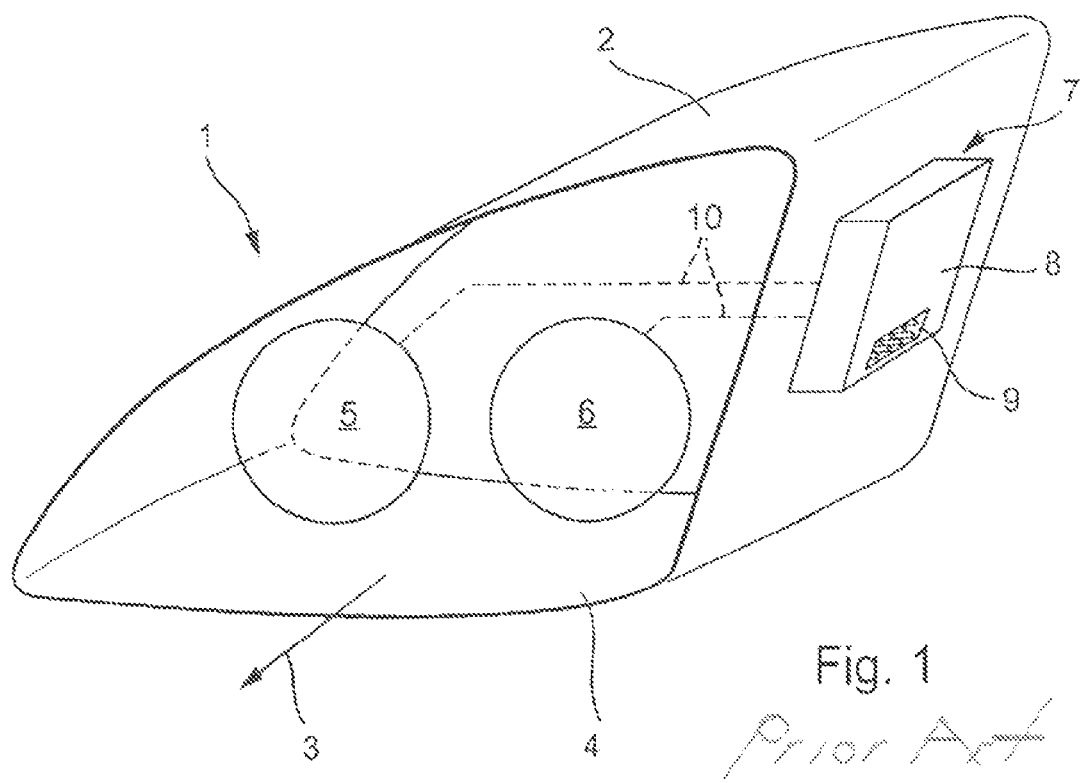

This application claims priority to and benefit of the filing date of German Patent Application 10 2009 060 790.0 entitled "Light Module for a Lighting Device of a Motor Vehicle as Well as the Lighting Device of a Motor Vehicle with Such a Light Module" and filed on Dec. 22, 2009.

BACKGROUND OF INVENTION

1. Field of Invention

The invention relates, generally, to a lighting device of a motor vehicle and, more specifically, to a light module employed with such a lighting device.

2. Description of Related Art

Lighting devices for motor vehicles that include semiconductor light sources—for example, in the form of light-emitting diodes (LEDs)—are known from the related art in various forms. Such lighting devices can be designed as a random motor-vehicle light—in particular, for arrangement on the rear or side of a motor vehicle.

However, the lighting devices can likewise be designed as "LED" headlights. In this connection, high-performance LEDs are used as semiconductor light sources that provide white or whitish light in sufficient luminous intensity so that the "LED" headlights can generate random light functions—for example, passing, high beam, fog, static or dynamic bending, town, country, expressway, or any other static or adaptive light distributions.

In the case of light modules known in the related art, the semiconductor light sources are normally arranged on a carrier module made of a material with a high thermal-conductivity value—for example, metal. This is the case, in particular, for "LED" headlights since the high-performance LEDs used there generate relatively much waste heat during operation that must be dissipated via the carrier module to the surroundings to prevent functional impairment or even damage to the lighting device. A control module for controlling the LEDs is designed as a controller spatially separate from the LEDs and connected to the LEDs via a plug-and-cable connection. Since the control of the semiconductor light sources normally takes place via a pulse-width modulation and the steep edges of the pulse-width modulated-control signal can cause electromagnetic disturbances, the connection cable must be screened between the controller and LEDs. For example, metal meshwork surrounding the wiring or plastic/metal meshwork is used for screening. Since the light module with the semiconductor light sources can be moved frequently either in a horizontal direction (for realization of a dynamic "bending light" function) and/or vertical direction (for realization of a "headlight range" control) relative to the controller (which is arranged spatially separate), the screened connection cable must, in addition, be as flexible and moveable as possible to not prevent a uniform movement of the light module and make possible a movement of the light module without great exertion of force. The spatial separation of semiconductor light sources, on the one hand, and the control module, on the other hand, in the case of the known light modules, hence, leads to increased space requirements as well as extra effort and expenses in the production and assembly of the light module.

Thus, there is a need in the related art for a light module for a lighting device of a motor vehicle that is simple and cost-effective to produce and assemble. There is a need in the related art for such a light module that also can be moved without difficulties relative to the residual lighting device.

SUMMARY OF INVENTION

The invention overcomes the disadvantages in the related art in a light module for a lighting device of a motor vehicle. The light module comprises at least one semiconductor light source that is mounted on a carrier element, which is designed on or includes a first printed-circuit board. A control module is electrically connected to and structurally spaced from the light source and designed on or includes a second printed-circuit board and includes an electric circuit constructed upon the second printed-circuit board and a connection element adapted to be connected to a higher-level controller and/or power supply of the motor vehicle. The control module is an electronic component of the light source such that a cable does not connect the control module and light source to each other. A substantially highly thermally conductive carrier module is arranged between the light source and control module. The carrier element, second printed-circuit board, and electric circuit are directly attached to the carrier module. At least one electrical connection is located on the carrier module between the light source or carrier element and the electric circuit or second printed-circuit board.

One advantage of the light module for a lighting device of a motor vehicle of the invention is that it is simple and cost-effective to produce and assemble.

Another advantage of the light module for a lighting device of a motor vehicle of the invention is that it can be moved without difficulties relative to the residual lighting device.

Another advantage of the light module for a lighting device of a motor vehicle of the invention is that the semiconductor light sources and control module are combined into a common, individually manageable unit having the carrier module as the central element.

Another advantage of the light module for a lighting device of a motor vehicle of the invention is that it is possible to save both the cable and plug of the plug-and-cable connection required in the case of the related art.

Another advantage of the light module for a lighting device of a motor vehicle of the invention is that the safeguard required in the related art in the controller and semiconductor light source—e.g., in the form of a short-circuit protection—can be saved.

Another advantage of the light module for a lighting device of a motor vehicle of the invention is that it is possible to remove the light module or a part of it (including the carrier module), control module, and semiconductor light sources as a unit from the lighting device and exchange it for another "LED" light module.

Another advantage of the light module for a lighting device of a motor vehicle of the invention is that it can be designed in a compact manner.

Another advantage of the light module for a lighting device of a motor vehicle of the invention is that heat emission by the carrier module is improved.

Another advantage of the light module for a lighting device of a motor vehicle of the invention is that the electrical connection between the semiconductor light sources and circuit of the control module can be designed to be rigid since the semiconductor light sources cannot be moved relative to the control module.

Another advantage of the light module for a lighting device of a motor vehicle of the invention is that the entire light module with the semiconductor light sources and control module can be moved as one unit.

Other objects, features, and advantages of the invention will be readily appreciated as the same becomes better understood while reading the subsequent description taken in conjunction with the accompanying drawings.

BRIEF DESCRIPTION OF EACH FIGURE OF DRAWING OF INVENTION

Figure 2:
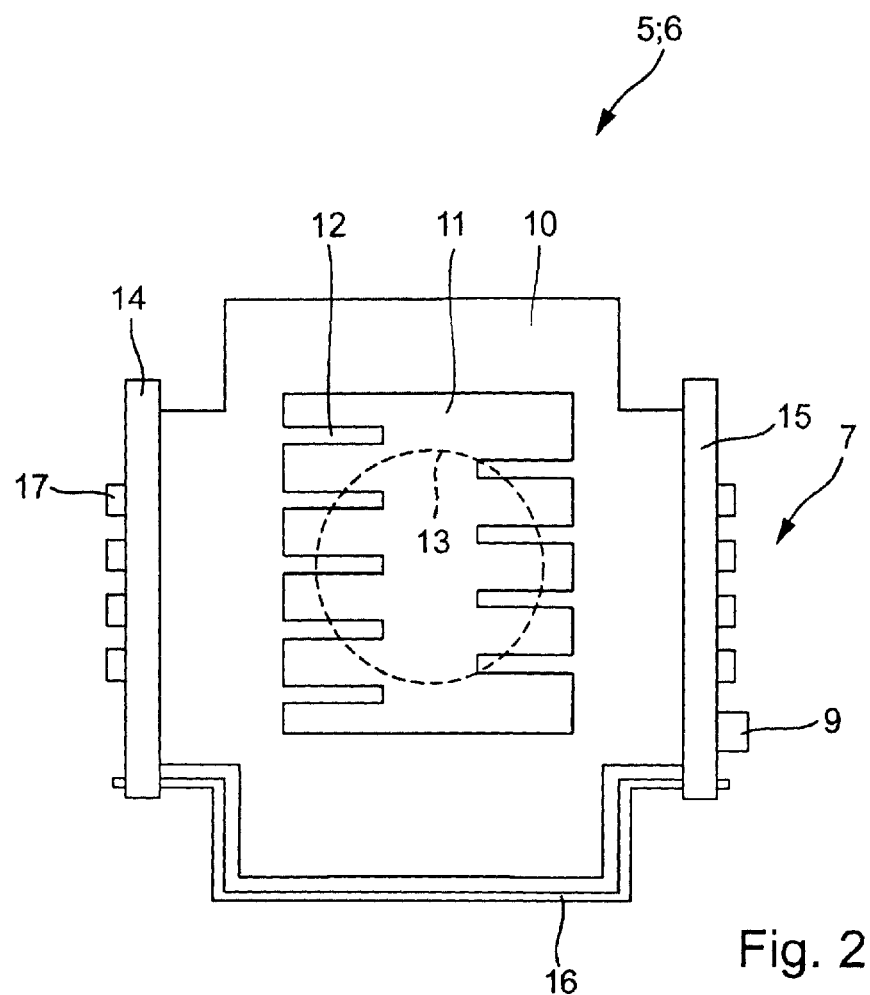

FIG. 1 is a perspective view of a known lighting device according to the related art; and FIG. 2 is a view of an embodiment of a light module for a lighting device of a motor vehicle according to the invention.

DETAILED DESCRIPTION OF EMBODIMENTS OF INVENTION

In FIG. 1, an embodiment of known lighting device for a motor vehicle in its entirety is generally indicated at 1. The lighting device 1 is designed as a motor-vehicle headlight. Of course, the lighting device 1 can also be designed as a light— for example, for arrangement on the rear or a side of the motor vehicle. The headlight 1 includes a housing 2, which can be made of plastic. The housing 2 includes a light-emission opening in one light-emission direction 3 of the headlight 1 that is sealed by a transparent sealing plug 4. The sealing plug 4 can be designed without an optically active profile (e.g., prisms) as a so-called "clear plug." As an alternative, the sealing plug 4 can also be provided (at least in regions) with optically active elements that effect a dispersion of the penetrating light (in particular, in a horizontal direction) and, with this, improve or facilitate the fulfillment of legal requirements for light distribution. The sealing plug 4 can be made of colorless, translucent plastic or glass.

Two light modules 5, 6 are arranged in the interior of the headlight housing 2. Of course, the lighting device 1 can also include fewer or more light modules than the light modules 5, 6 shown in FIG. 1. During operation, according to regulation, the light modules 5, 6 can be moveable relative to the housing 2 or fixed in the housing 2. A movement of one or both of the light modules 5, 6 in a vertical direction, for example, serves the purpose of realization of a "headlight range" control. The light modules 5, 6 can be designed as "reflection" modules and/or as "projection" modules. In the case of a "reflection" module, the light emitted by a light source is reflected by a reflector for the generation of a desired partial or total light distribution onto the lane in front of the vehicle. In the case of a "projection" system, the light emitted from a light source is bundled by a primary optical system—for example, a reflector or an auxiliary optical system—and then projected by a secondary optical system, which is, for example, designed as a projection lens for generation of the desired partial or total light distribution onto the lane in front of the motor vehicle. The desired light distribution of the lighting device 1 can be generated by the individual light modules 5, 6 or interaction of both of the light modules 5, 6. The light modules 5, 6 in the embodiment generate (either alone or jointly) a/an passing, high beam, fog, town, country, expressway, static or dynamic bending, daytime running, navigation, and/or random other static or adaptive light distribution.

The known lighting device 1, in addition, has a control module in the form of a controller, generally indicated at 7 that, for example, is flange-mounted outside on the headlight housing 2. An electric circuit of the control module 7 is arranged in a controller housing 8. The housing 8 can include an electromagnetic-radiation screening material—in particular, metal. Connecting cables 10 run from the electric circuit of the control module 7 to the light modules 5, 6. The connecting cables 10 serve the purpose of controlling and/or supplying power to the light modules 5, 6. To improve the electromagnetic compatibility, the wires 10 are screened, for example, by metal meshwork or metal/plastic meshwork surrounding the wires 10. If the light modules 5, 6 can be displaced relative to the headlight housing 2, the wires 10 as well as the screen must be flexibly designed. The wires 10 are conducted through an opening in the headlight housing 2 beneath the controller housing 8 into the interior of the housing 2. The controller housing 8 includes an opening through which it is possible from the outside to access a plug or socket element 9 of the electric circuit of the control module 7. Via the plug or socket element 9, the control module 7 can be connected to a higher-level controller (e.g., a so-called "body controller") and/or power supply of the motor vehicle—for example, the battery of the vehicle.

Disadvantages arise from the spatial separation of the light modules 5, 6 and controller 7 in the case of the known lighting device 1 from FIG. 1. The disadvantages are prevented by the design of the light module of the invention, generally indicated at 5, 6 in FIG. 2. The light module 5, 6 of the invention includes a carrier module 10 having a material with a high thermal-conductivity value. The carrier module 10 can be made of metal—in particular, aluminum. In an embodiment, the carrier module 10 is made by die-casting. The carrier module 10 serves the purpose of heat dissipation and simultaneous fastening of the components of the light module 5, 6.

To improve the heat dissipation, the carrier module 10 includes a hollow space 11 into which passive cooling elements 12—for example, in the form of cooling ribs and/or cooling pens—protrude. In an embodiment, active cooling media 13 are assigned to the carrier module 10—for example, in the form of a fan 13. In the process, a holder for the fan 13 can be integrated into the carrier module 10. Of course, it is conceivable that the carrier module 10 of the light module 5, 6 of the invention is designed without a hollow space 11. In this case, the passive cooling elements 12 can be designed on an exterior of the carrier module 10.

In the case of the light module 5, 6 of the invention, semiconductor light sources in the form of LEDs are arranged on a carrier element 14. The carrier element 14 is, for example, designed on a metal-core printed-circuit board. The "LED" carrier 14 is mounted onto the carrier module 10—e.g., by screwing or adhesion. An electric circuit of the control module 7 is designed on a conventional printed-circuit board 15—for example, an "FR4" board. The electric circuit of the control module 7 includes, for example, also the plug or socket element 9. A plurality of other components of the electric circuit—such as electrical and electronic components as well as conductor paths—are likewise designed on or in the printed circuit board 15 (but not shown separately in FIG. 2). The printed-circuit board 15 of the control module 7 is also mounted on the carrier module 10—for example, by screwing or adhesion.

Electrical connections 16 are designed in or on the carrier module 10 between the semiconductor light sources 17 or carrier element 14 and the electric circuit of the control module 7 or printed-circuit board 15. In the embodiment, the connections 16 are realized in the form of a pressed grid 16 that runs along the bottom of the carrier module 10. The pressed grid 16 can be extrusion-coated with an electrical insulating material—for example, plastic. The contact of the electrical components (LEDs 17 or electrical wires of the carrier element 14 and electrical wires or components of the circuit of the control module 7) with the pressed grid 16 can take place by "press fit" technology. However, it is likewise possible to achieve the contact by a "solder" or "bonding" connection.

Unlike the known lighting device 1 from FIG. 1, in the case of the lighting device of the invention, the controller 7 is, thus, a component of at least one of the light modules 5, 6. Hence, connecting cables 10 and corresponding plug elements can be dispensed with.

In the case of a defect of the light module 5, 6 of the invention or a part thereof (for example, an LED 17), the entire light module 5, 6 can be exchanged as a unit for a new, completely functional light module 5, 6. To this end, it is conceivable that an electric connection to the power supply of the light module 5, 6 and/or for connection of the control module 7 to a higher-level controller (e.g., a so-called "body controller"), the plug or socket element 9 can enter into detachable engagement with a corresponding socket or plug element of the lighting device 1.

In addition to the parts and components shown in FIG. 2, the light module 5, 6 of the invention can also include further parts and components that, however, are not shown in FIG. 2. Such parts or components are, for example, a primary optical system (e.g., reflector or ancillary lens) for bundling the light beams emitted from the LEDs 17 as well as a secondary optical system (e.g., projection lens) to project the light beams of the LEDs 17 for generation of a desired partial or total light distribution of the lighting device 1 on the lane in front of the motor vehicle. It would also be conceivable that the light module 5, 6 permits in other ways (e.g., a "diaphragm" arrangement) a variation of the generated light distribution. To generate a variable light distribution, these ways can also be designed to be moveable so that they can be introduced more or less into or moved out of the beam projection.

The carrier element 14 upon which the LEDs 17 are mounted can also be designed as a conventional printed-circuit board or so-called "Flexboard." The LEDs 17 can be soldered onto the carrier element 14. The control module 7 is arranged on a separate printed-circuit board 15. Those having ordinary skill in the related art should appreciate that the carrier module 10 can be designed as a standardized receiving module to which the carrier element 14 as well as the printed-circuit board 15 are mechanically fastened by standardized connections and can be electrically contacted. The standardized connections can, for example, be designed as plug connections. In this way, both the LEDs 17 and the control module 7 are arranged and fastened to a standardized module. The carrier element 14 can be fastened to the receiving module 10 by, for example, a snap-on, screw, or rivet connection. The electric connection takes place via the standardized receiving module 10. As a result of this, the electric connections are simplified. In addition, higher quantities are achieved by standardized modules, and development costs can be saved since fully functional and sufficiently tested modules can be used.

The standardized modules 17, 14, 7, 15, 10 can be used for different projects so that higher quantities and lower development costs accrue. Through the use of the standardized modules 17, 14, 7, 15, 10, in addition, the expense of validation can be reduced. In the case of the use of modules with an integrated current regulator, a sorting of the "LED" brightness bins is not necessary since each LED 17 has its own adjustable power source. In the case of a defect of parts of the light module 5, 6, those having ordinary skill in the related art should appreciate that the modules 17, 4, 7, 15, 10 can be exchanged individually. As a result, a relatively expensive replacement of the entire light module 5, 6 is avoided. Since the light module 5, 6 does not include movable wiring, there is no danger of a short-circuit. In addition, wires and plug connections can be economized in considerable measure.

The receiving module 10 has the tasks of mechanically fixing the carrier element 14 to the LEDs 17 as well as the printed-circuit board 15 to the electric circuit of the control module 7. Moreover, it serves the purpose of receiving and holding the electric connections (e.g., pressed grid 16, wires, or the like). In addition, cooling (e.g., passive cooling elements 12 or active cooling media 13) or a mechanical holder for the active cooling media 13 (e.g., fan 13) is integrated in the receiving module 10. Finally, the receiving module 10 can also be used for holding and fastening additional parts and components (e.g., an optical system) of the light module 5, 6.

In accordance with another embodiment, those having ordinary skill in the related art should appreciate that the semiconductor light sources 17 and circuit of the control module 7 can be arranged on the same carrier element. In this case, the electric connection 16 would also be realized on the common carrier element—for example, in the form of conductor paths. The carrier element could also be designed as a metal-core printed-circuit board, a "Flexboard," or an "FR4" board. It is conceivable to bend a carrier element such that it is adapted to the exterior form of the carrier module 10. The contact of the circuit of the control module 7 as well as the LEDs 17 on the common carrier takes place, for example, by so-called "gull-wing leads" or "J-type leads." In the case of this design, the required cabling (e.g., the pressed grid 16 from FIG. 2) can be saved. The sizes and dimensions of the modules 17, 14, 7, 15, 10 are variable. Fixed points that should be observed whenever possible (in the case of all modules) are only the mechanical fixation of modules 17, 14, 7, 15 on the receiving module 10 as well as their electric contacts.

The invention been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A light module (5, 6) for a lighting device (1) of a motor vehicle said light module (5, 6) comprising:
    at least one semiconductor light source (17);
    a carrier element (14) on which said light source (17) is mounted and that either of is designed on and includes a first printed-circuit board;
    a control module (7) electrically connected to and structurally spaced from said light source (17), either of designed on and including a second printed-circuit board (15), and including an electric circuit constructed upon said second printed-circuit board (15) and a connection element (9) adapted to he connected to at least one of a higher-level controller and power supply of the motor vehicle, wherein said control module (7) is an electronic component of said light source (17) such that a cable does not connect said control module (7) and light source (17) to each other; and
    a substantially highly thermally conductive carrier module (10) arranged between said light source (17) and control module (7), to which said carrier element (14), second printed-circuit board (15), electric circuit are directly attached, and on which at least one electrical connection (16) is located between either of said light source (17) and carrier element (14) and either of said. electric circuit and second printed-circuit board (15).

2. A light module (5, 6) as set forth in claim 1, wherein said light source (17) and control module (7) are arranged respectively on different sides of said carrier module (10).

3. A light module (5, 6) as set forth in claim 2, wherein said light source (17) and control module (7) are arranged respectively on opposing sides of said carrier module (10).

4. A light module (5, 6) as set forth in claim 1, wherein said electrical connection (16) includes a pressed grid (16) arranged on said carrier module (10).

5. A light module (5, 6) as set forth in claim 4, wherein said, pressed grid (16) is coated with an insulating material.

6. A light module (5, 6) as set forth in claim 1, wherein said carrier module (10) includes passive cooling elements (12) for enlargement of at least a surface of said carrier module (10).

7. A light module (5, 6) as set forth in claim 6, wherein said passive cooling elements (12) include at least one of cooling ribs (12) and cooling pens (12).

8. A light module (5, 6) as set forth in claim 1, wherein said light module (5, 6) includes active cooling media (13).

9. A light module (5, 6) as set forth in claim 8, wherein said active cooling media (13) includes a fan (13).

10. A light module (5, 6) as set forth in claim 1, wherein said first printed-circuit board is a metal-core printed circuit board.

11. A light module (5, 6) as set forth in claim 1, wherein said second printed-circuit (15) board is an "FR4" board (15).

12. A light device (1) of a motor vehicle comprising:
a light module including:
at least one semiconductor light source (17);
a carrier element (14) on which said light source (17) is mounted and that either of is designed on and includes a first printed-circuit board;
a control module (7) electrically connected to and structurally spaced from said light source (17), either of designed on and including a second printed-circuit board (15), and including an electric circuit constructed upon said second printed-circuit board (15) and a connection element (9) adapted to be connected to at least one of a higher-level controller and power supply of the motor vehicle, wherein said control module (7) is an electronic component of said light source (17) such that a cable does not connect said control module (7) and light source (17) to each other; and
a substantially highly thermally conductive carrier module (10) arranged between said light source (17) and control module (7), to which said carrier element (14), second printed-circuit board (15), and electric circuit are directly attached, and on which at least one electrical connection (16) is located between either of said light source (17) and carrier element (14) and either of said electric circuit and second printed-circuit board (15).

13. A lighting device (1) as set forth in claim 12, wherein said light source (17) and control module (7) are arranged respectively on different sides of said carrier module (10).

14. A lighting device (1) as set forth in claim 12, wherein said electrical connection (16) includes a pressed grid (16) arranged on said carrier module (10).

15. A lighting device (1) as set forth in claim 12, wherein said carrier module (10) includes passive cooling elements (12) for enlargement of at least a surface of said carrier module (10).

16. A lighting device (1) as set forth in claim 12, wherein said light module(5, 6) includes active cooling media (13).

* * * * *

UNITED STATES PATENT AND TRADEMARK OFFICE
CERTIFICATE OF CORRECTION

| | | |
|---|---|---|
| PATENT NO. | : 8,608,358 B2 | Page 1 of 1 |
| APPLICATION NO. | : 12/973116 | |
| DATED | : December 17, 2013 | |
| INVENTOR(S) | :Schnerr et al. | |

It is certified that error appears in the above-identified patent and that said Letters Patent is hereby corrected as shown below:

In the Claims:

Column 6, line 54 delete "he" and insert therefor --be--.
Column 6, line 63 insert --and-- before "electric".
Column 6, line 66 delete "." after "said".
Column 7, line 10 delete "," after "said".
Column 7, line 28 delete "light" and insert therefor --lighting--.

Signed and Sealed this
Twenty-fifth Day of February, 2014

Michelle K. Lee
*Deputy Director of the United States Patent and Trademark Office*